US006325362B1

(12) United States Patent
Massey et al.

(10) Patent No.: US 6,325,362 B1
(45) Date of Patent: Dec. 4, 2001

(54) COOLING AND MISTING APPARATUS FOR EVAPORATIVE COOLING OF OPEN-AIR VEHICLE OCCUPANTS

(76) Inventors: Raymond O. Massey, 1623 Fall Valley, Houston, TX (US) 77077; Mark E. Massey, 4119 E. Northampton Pl., Houston, TX (US) 77098; William C. Barwell, 5307 LaBranch, Houston, TX (US) 77004; Alan L. Baezner, 13227 James La., Stafford, TX (US) 77477; Erick D. Sossamon, 23683 E. Heritage Oaks Dr., Porter, TX (US) 77365; Jeff Fisher, 6607 Brodie Ln #826, Austin, TX (US) 78745

(*) Notice: Subject to any disclaimer, the term of this patent is extended or adjusted under 35 U.S.C. 154(b) by 0 days.

(21) Appl. No.: 09/320,065

(22) Filed: May 26, 1999

(51) Int. Cl.[7] ........................ B01F 3/04

(52) U.S. Cl. ........................ 261/127; 261/28; 261/78.2; 261/89; 261/DIG. 43; 280/DIG. 5

(58) Field of Search ........................ 261/28, 29, 37, 261/30, 78.2, 89, 90, 127, 140.1, DIG. 3, DIG. 43; 280/DIG. 5

(56) References Cited

U.S. PATENT DOCUMENTS

| | | | | |
|---|---|---|---|---|
| 2,075,389 | * | 3/1937 | Eubank | 261/30 |
| 3,306,591 | * | 2/1967 | Valazza | 261/29 |
| 4,513,577 | | 4/1985 | Wilson et al. | 62/91 |
| 4,839,106 | * | 6/1989 | Steiner | 261/28 |
| 4,873,964 | * | 10/1989 | Bonoan | 280/DIG. 5 |
| 4,993,639 | | 2/1991 | Hata | 239/289 |
| 5,112,535 | | 5/1992 | Roberson | 261/27 |
| 5,121,882 | | 6/1992 | Skidmore | 239/269 |
| 5,330,104 | | 7/1994 | Marcus | 239/266 |
| 5,337,960 | | 8/1994 | Allen | 239/280.5 |
| 5,338,495 | | 8/1994 | Steiner et al. | 261/28 |
| 5,373,703 | | 12/1994 | Pal | 62/91 |
| 5,441,202 | | 8/1995 | Wintering et al. | 239/267 |
| 5,497,633 | | 3/1996 | Jones et al. | 62/314 |
| 5,540,383 | | 7/1996 | Ducey | 239/1 |
| 5,598,719 | | 2/1997 | Jones et al. | 62/304 |
| 5,613,371 | | 3/1997 | Nelson | 62/244 |
| 5,620,633 | | 4/1997 | Junkel et al. | 261/28 |
| 5,628,273 | | 5/1997 | Crouse, II | 114/343 |
| 5,628,455 | * | 5/1997 | Fukuta | 239/2.1 |
| 5,645,769 | * | 7/1997 | Tamaru et al. | 261/30 |
| 5,661,984 | * | 9/1997 | Durrell et al. | 261/DIG. 43 |
| 5,667,731 | | 9/1997 | Junkel et al. | 261/24 |
| 5,667,732 | | 9/1997 | Lederer | 261/28 |
| 5,702,646 | * | 12/1997 | Braendli | 261/89 |
| 5,715,999 | | 2/1998 | Hsu | 239/29 |
| 5,722,596 | | 3/1998 | Dome | 239/289 |
| 5,724,824 | | 3/1998 | Parsons | 62/171 |
| 5,752,662 | | 5/1998 | Hsu | 239/215 |
| 5,772,272 | * | 6/1998 | Faddis | 280/DIG. 5 |
| 5,785,204 | | 7/1998 | Thompson et al. | 221/24 |
| 6,027,137 | * | 2/2000 | Rura | 261/DIG. 3 |

* cited by examiner

*Primary Examiner*—C. Scott Bushey
(74) *Attorney, Agent, or Firm*—Akin, Gump, Strauss, Hauer & Feld, L.L.P.

(57) ABSTRACT

An apparatus for cooling occupants of an open-air vehicle with a mist of water provided by a spray nozzle and blown by a fan onto the occupants. An apparatus having a water reservoir, pump, heat exchanger, nozzle for atomizing water and fan provides a mist of water through directional vents resulting in enhanced evaporative cooling of the vehicle occupants.

14 Claims, 5 Drawing Sheets

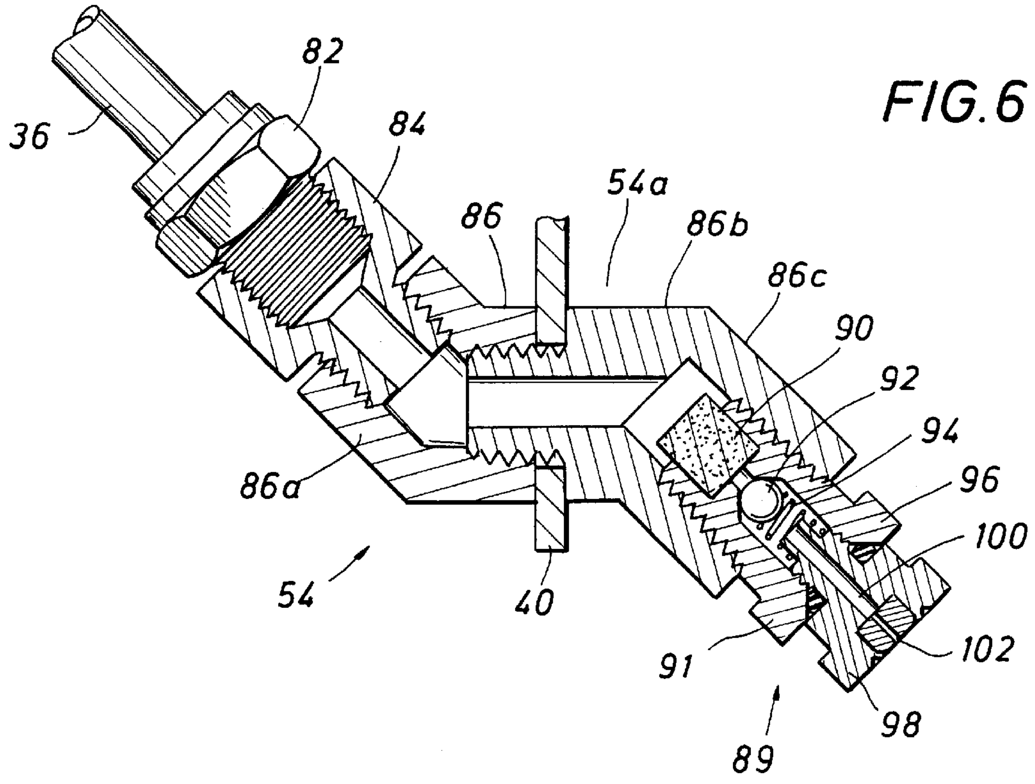
FIG. 6
FIG. 7
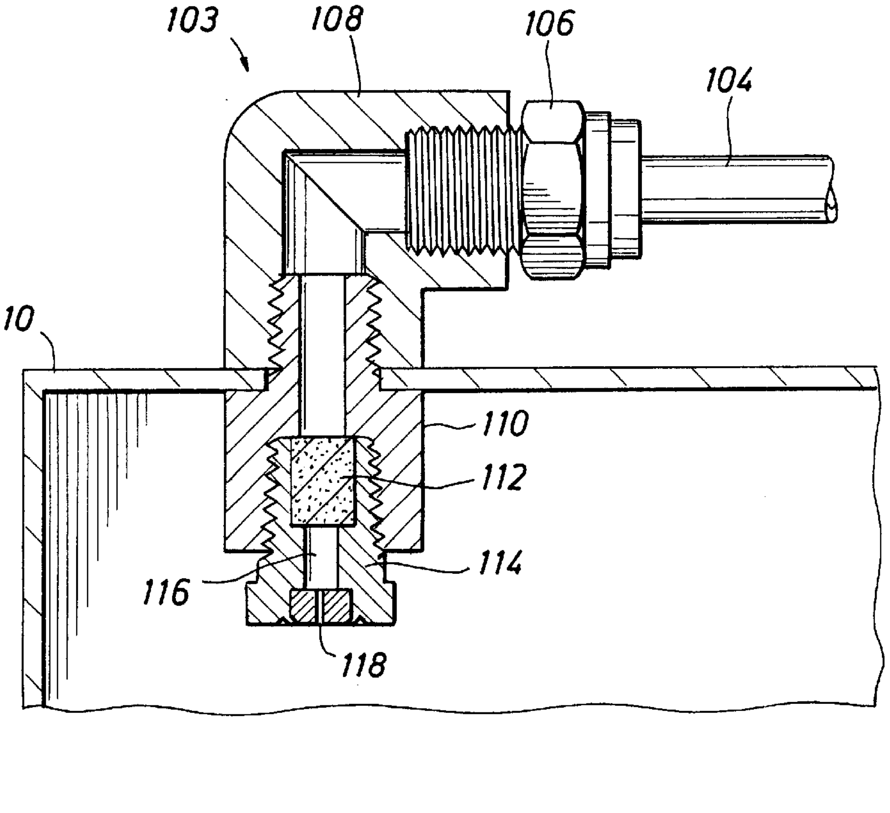

FIG. 8
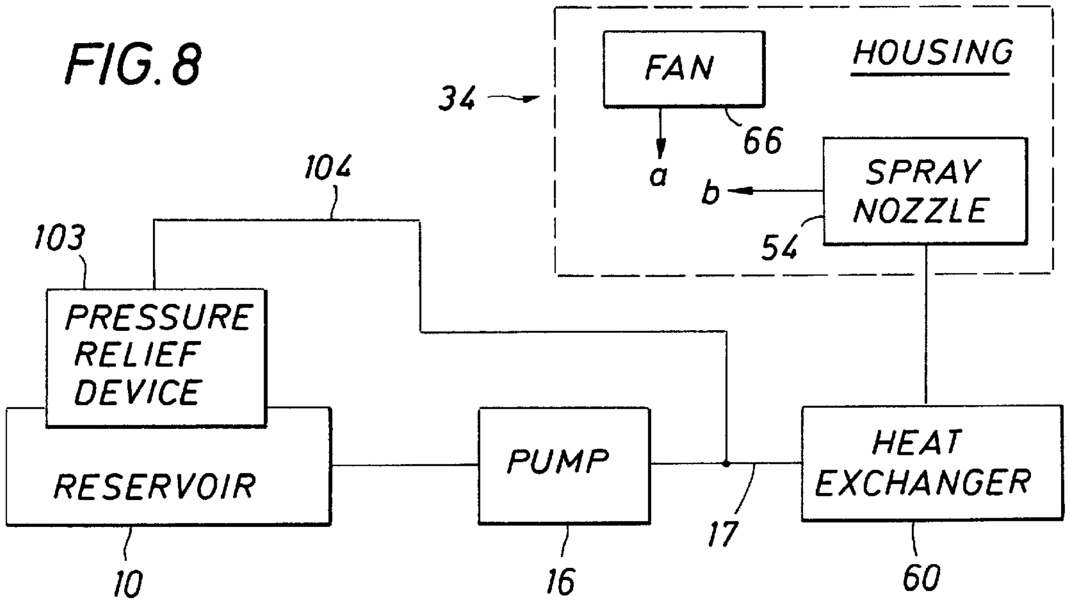
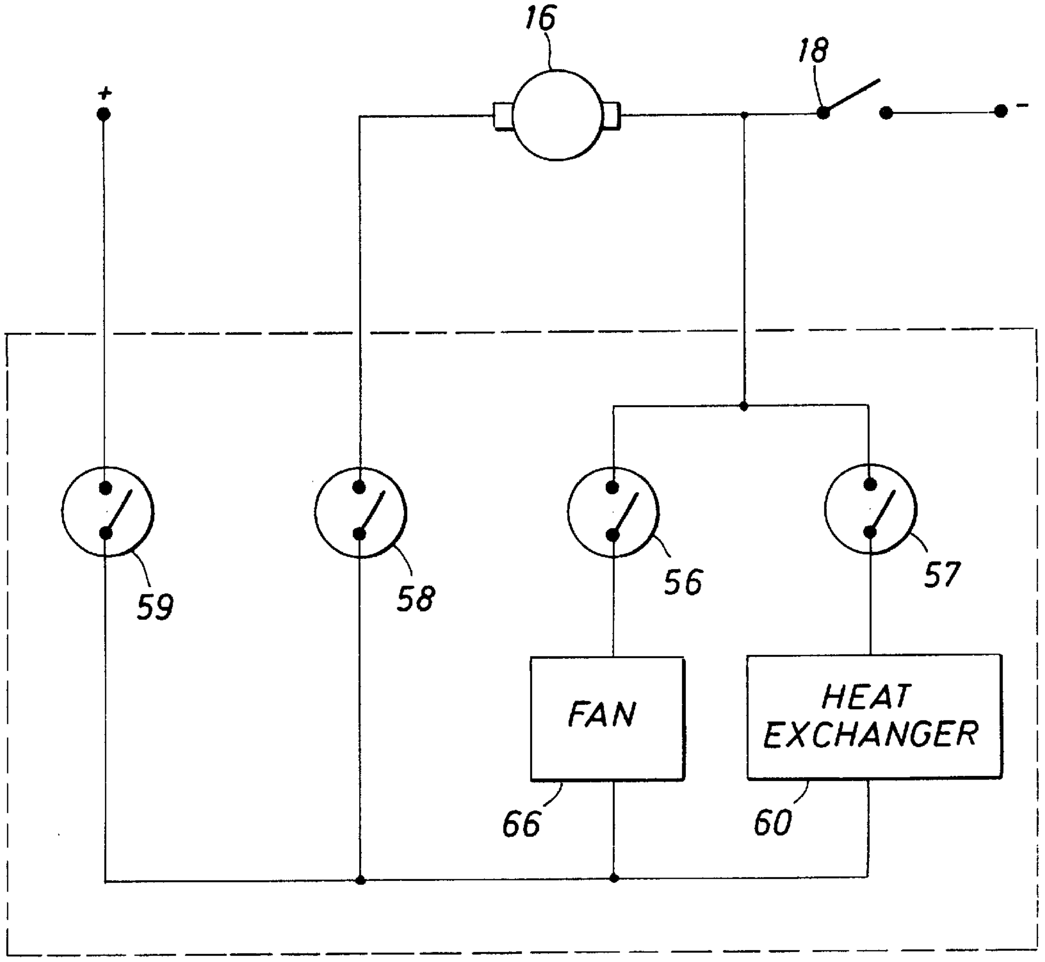
FIG. 9

COOLING AND MISTING APPARATUS FOR EVAPORATIVE COOLING OF OPEN-AIR VEHICLE OCCUPANTS

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to a method and apparatus for cooling and spraying a mist into the cab area of an open-air vehicle such as a golf cart.

2. Description of the Related Art

Many outdoor activities in hot, dry climates involve the use of open-air vehicles such as golf carts, boats, dune buggies and convertible sports utility vehicles. Also, agricultural vehicles and construction vehicles often have open-air cabs. Ambient temperatures at certain times of the year are quite hot, particularly at lower latitudes. It is desirable to have a method and apparatus for cooling the occupants of such open-air vehicles. The concept of spraying a fine water mist onto occupants of such open-air vehicles is a good one because evaporation of the mist from the skin causes cooling of the skin.

Insofar as known, however, existing misting devices have one or more of the following disadvantages:

1. They rely solely on evaporative cooling;
2. They lack a directional air flow to direct the mist onto the vehicle occupants;
3. The electrically powered components drain the batteries too rapidly;
4. They lack pressure relief systems to prevent dripping from the mist nozzles;
5. They require large surface area pads to cool air drawn through the pads;
6. The evaporative unit is mounted on the roof of a golf cart vehicle which is unsightly and places a significant weight at a point of lower structural strength.

There exists a need for a mist producing device for open-air vehicles which cools the liquid prior to atomization. There also exists a need to reduce the power consumption of misting devices to allow the occupants to play a round of golf without draining the battery power supply. There also exists a need for a method and apparatus for providing a nondripping, uniform mist directed into an open-air vehicle using a directional air flow to direct the mist onto the vehicle occupants.

BRIEF SUMMARY OF THE INVENTION

A golf cart or other open-air vehicle is equipped with an apparatus for providing an atomized spray of water which is sprayed into an air flow directed into the cab area of the vehicle to provide evaporative cooling. A pump system draws water from a water reservoir and pumps the water into liquid conveying tubes which provides the pressurized water simultaneously to a pressure relief valve and to atomizing spray nozzles.

The spray nozzles are located so as to spray mist in front of a movable vent used to direct air flow from fans mounted in a housing. The directed air flow carries the water mist as an air/mist combination onto the occupants of the golf cart. The fan, fan motor, and heat exchanger may all be mounted in a housing which may be attached to the golf cart roof by an expandable bracket.

The misting device may also have a pressure activated switch mounted under the seat so as to automatically activate the misting device when an occupant sits down and automatically stops the misting device when the driver exits the golf cart to conserve water.

The misting apparatus may also include a heat exchanger to pre-cool the water after the water is pumped out of the reservoir and prior to the water reaching the spray nozzle assembly. The heat exchanger allows the misting device to spray a water mist that is below ambient temperature. This enhances the overall cooling effectiveness since a water mist that has a temperature below ambient temperature absorbs more heat energy prior to vaporization than water mist at ambient temperature.

BRIEF DESCRIPTION OF THE SEVERAL VIEWS OF THE DRAWINGS

FIG. 6 is a side elevation sectional view of the spray nozzle assembly;

FIG. 7 is a side elevation sectional view of the pressure relief valve;

FIG. 8 is a schematic of the water mist delivery system; and

FIG. 9 is a schematic electrical diagram of the invention.

DETAILED DESCRIPTION OF THE INVENTION

Figure 1:
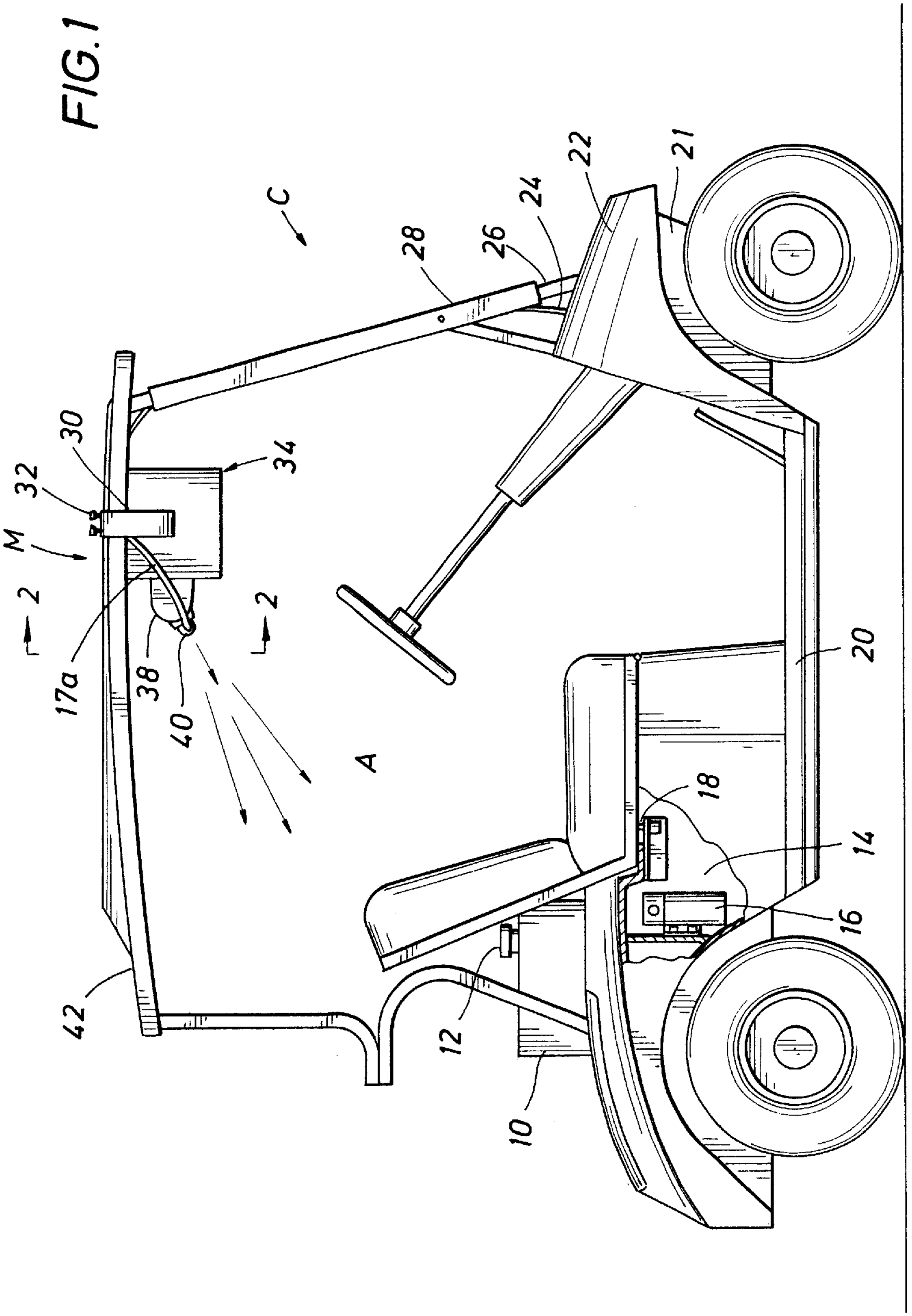
FIG. 1 is a side view of one embodiment according to the present invention mounted on a golf cart.
Figure 4:
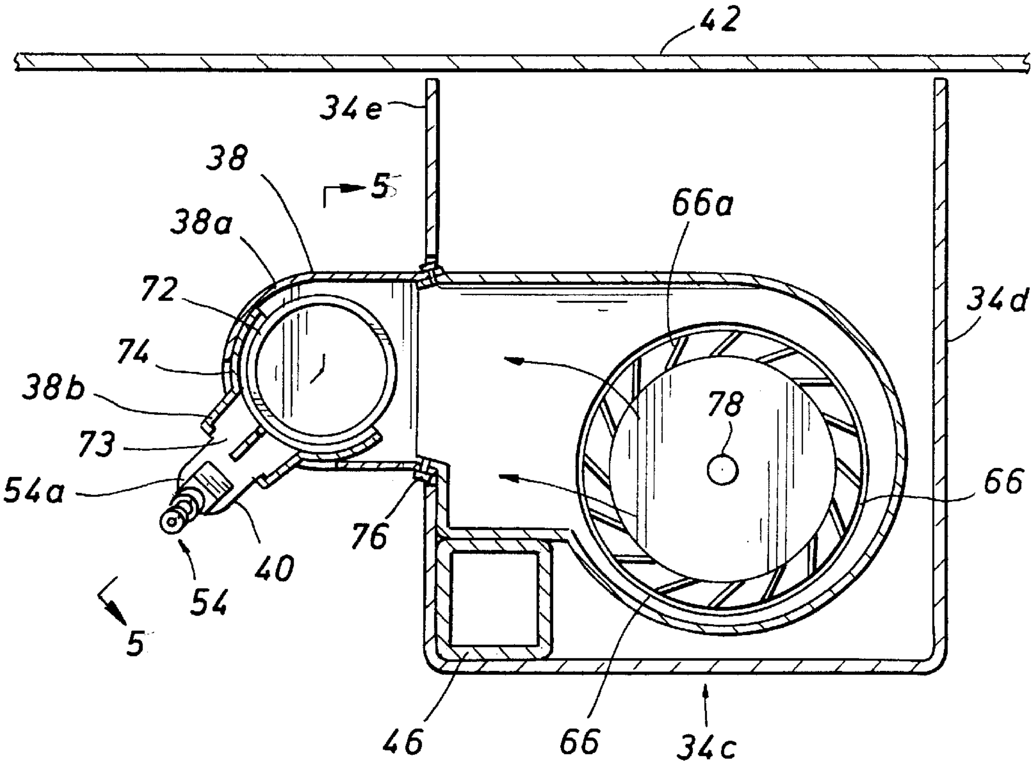
FIG. 4 is a side elevation, sectional view of the housing and internal elements along lines 4—4 in FIG. 2.

The misting apparatus for use on a golf cart in accordance with the present invention will be described with reference to the embodiments illustrated in the accompanying drawings. FIG. 1 shows a side elevational view of a golf cart C having a preferred embodiment of the present invention of a misting apparatus generally designated as M installed on the golf cart C. The misting apparatus M includes a housing 34, as shown in FIGS. 1 and 4 containing fan 66 and nozzle 54 as shown in FIG. 4. The golf cart C illustrated in FIG. 1 is exemplary of the various types and styles available, whether driven by a battery-operated motor or gas-powered. The misting apparatus M may be attached to any other type of open-air vehicle as previously disclosed, or used in any warm environment where it is desirable to provide a cooling effect.

Water reservoir 10 having a filling hole 12 is mounted externally on the rear of the golf cart. Alternatively, where there is space available in battery chamber 14, the reservoir 10 may be stored therein. Pump 16 may be mounted within the battery chamber 14 to aid in the reduction of noise in the vicinity of the golf cart C when the pump is operating. Alternatively, a low-noise level pump may be mounted on the exterior of the golf cart or a pump may be mounted on the exterior of the golf cart in conjunction with sound insulating materials.

Referring to FIGS. 1 and 9, the pump 16 may be automatically actuated by use of a pressure sensitive switch 18 mounted under the seat 11 of the golf cart C. Use of the pressure activated switch 18 limits activation of the pump to only such time that the cab area A of the golf cart is occupied and without requiring manual intervention by the occupant to start and stop the pump. This automatic engagement of the pump by use of a pressure sensitive switch 18 aids in the reduction of power drain from the batteries by the pump, fan and/or heat exchanger and restricts water usage from the reservoir 10.

Figure 2:
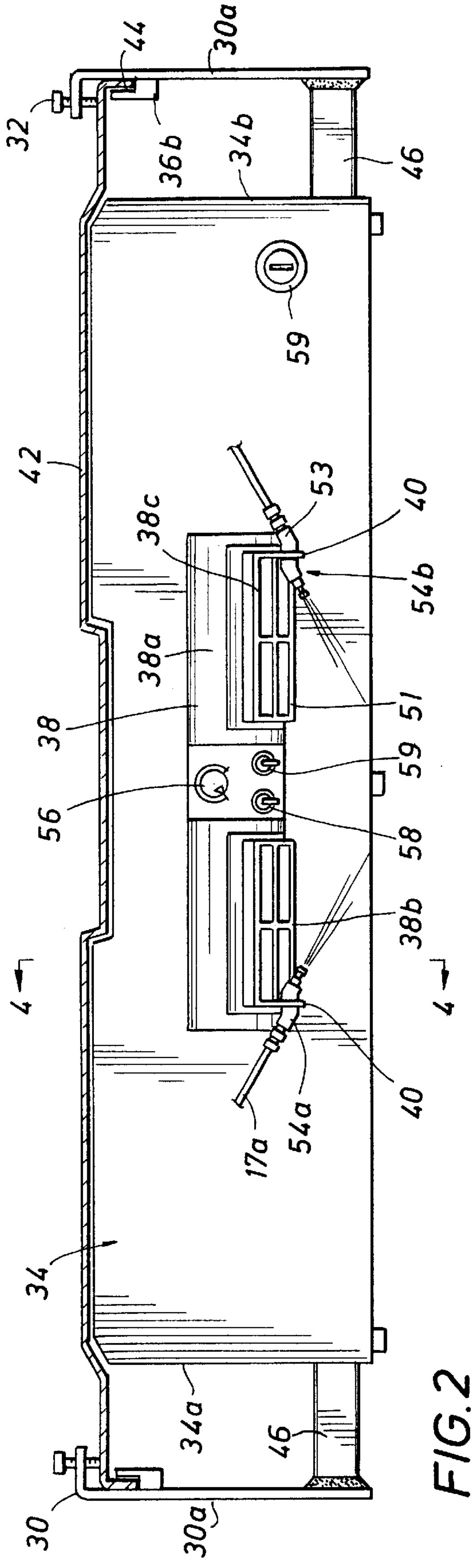
FIG. 2 is a front elevation external view of bracket and housing attached to a golf cart cab roof.
Figure 3:
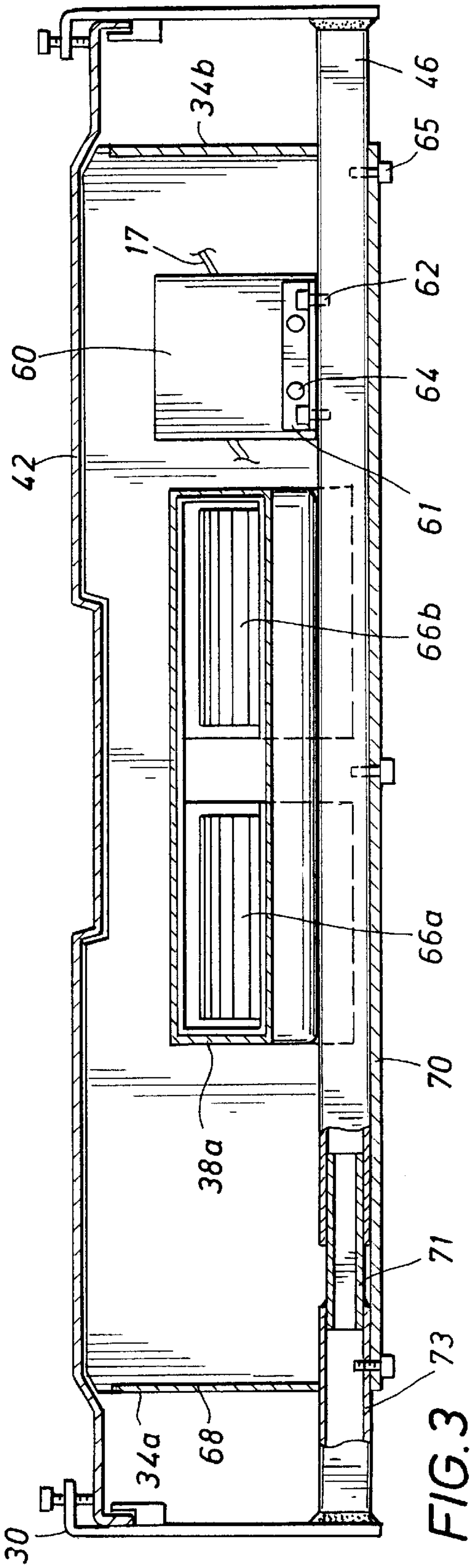
FIG. 3 is a front elevation, sectional view of the bracket and housing of FIG. 2.

The pump 16 pressurizes and conveys the water through a line 17 into the heat exchanger 60 as shown in FIG. 3. The water conveying line 17 may be flexible tubing or rigid metal or plastic tubing as dictated by ease of installation and maintenance needs. The water conveying line 17 extending from pump 16 may be placed under the trim 20 of the golf cart toward the front of the golf cart and exit through the wheel well 21. The line 17 then extends along body 22 of the golf cart and up the roof's support strut 26 into the housing 34. A cover 28 may be placed over the tubing and attached to the roof's support strut 26 both to the conceal and to protect the tubing. Bracket 30 detachably mounts the housing 34 to the cab roof 42 of the golf cart as discussed further in reference to FIG. 2. As shown in FIGS. 2 and 4, the liquid conveying tube portion 17*a* is attached to spray nozzle assembly 54 which is held by nozzle support 40. The nozzle support 40 is integrally formed with vent cover 38. Alternatively, the nozzle support may be a separate piece attached by conventional methods including, but not limited to, the use of adhesives or mechanical fasteners.

The housing 34 for the misting apparatus M is a generally rectangular box having side walls 34*a* and 34*b*, bottom 34*c* and rear wall 34*d*. A bracket assembly 30 is mounted onto the golf cart cab roof 42 in order to mount the housing 34 under the golf cart cab roof 42. As shown in FIGS. 2 and 3 the removable bracket assembly 30 includes side members 46 (only one of which will be described) which support vertical members 30*a* which receive the cab roof 42 into the roof gripping slots 44 formed by an internally mounted sub-bracket 30*b* attached to vertical member 30*a*. The bracket assembly 30 is secured to the cab roof 42 by applying pressure through tightening bolts 32. The design of the bracket assembly 30 aids ease of installation on many different types of golf carts and aids in removal of the bracket and housing for maintenance.

Referring to FIG. 4, the housing 34 further includes a bottom 34*c,* rear wall 34*d,* and front wall 34*e*. A vent assembly generally designated at 38, and including a generally hemispherical housing portion or vent cover 38*a,* is attached to the front housing wall 34*a*. The vent assembly 38 includes first and second pivotally mounted vents 38*b* and 38*c,* which are mounted in the vent cover 38*a* by a known pivotal mounting arrangement (not shown) such that the slats 51 of each of the vents 38*b* and 38*c* direct air toward the occupants of the cart C. FIG. 3 shows the fans 66*a* and *b* which are located behind the vent cover 38*a* as shown in FIG. 2 to direct air outwardly of the vents 38*b* and 38*c*. As shown in FIGS. 2–8, the vent cover 38*a* has nozzle supports 40 which hold the spray nozzle assembly 54, which includes nozzles 54*a* and 54*b*. The nozzle support 40 maintains the spray nozzle assembly 54 in a fixed position relative to the directional air vent slats 51 (FIG. 2) in which the direction of mist ejection is at an acute angle with respect to the front edge of air flow slats 51, as further defined below. This fixed relative position between the nozzle support 40, the spray nozzle assembly 54, and the directional air vents slots 51 ensures that the spray mist of water is injected directly into the air flow from the fan which is directed toward the golf cart occupant. FIG. 1 shows the bracket and housing mounted so as to spray the air/mist combination rearwardly toward the golf cart occupant. Alternatively, the bracket and housing may be mounted so as to provide the air/mist combination from the side or from the back of the golf cart.

As shown in FIG. 2 the housing 34 has a switch panel located between vents 38*a–b* with a switch 56 for engaging the fan 66. The switch 56 for the fans 66*a–b* may be a simple on/off switch or a variable speed controller. A variable speed controller permits slower fan speeds to reduce noise in and around the golf cart and also allows higher fan speeds for enhanced cooling. Also, higher fan speed settings may reduce any mist dispersing problems caused by wind. The switch 58, as shown in FIG. 2 permits turning the pump off while still using only the fan to blow air on the occupants. Key switch 59 is a lock out device preventing activation of the misting apparatus. This permits a vendor to charge an additional rental fee for the use of the misting apparatus over and above any fees charged for the use of the golf cart.

FIG. 3 is a side elevational and sectional view of the bracket and the housing. FIG. 3 shows a heat exchange unit 60 attached to a mounting bracket 61 by means of screws 64. The mounting bracket 61 is attached to the bracket bar 46 by screws 62. Also, shown in FIG. 3, the housing 34 is mounted to the bracket bar 46 by the use of screws or bolt 65. The mounting bracket and housing may be attached by other conventional methods including, but not limited to, welding.

The bracket bar 46 shown in FIGS. 2, 3, and 4 is longitudinally extendable so as to permit the bracket 30 to fit on a golf cart cab of any width, such adjustability if accomplished by the use of telescoping bracket sections 71 and 73. An adjustable width bracket bar avoids the need to custom design brackets for golf carts made by different vendors. Although the housing 34 may be custom made to fit the contours of the cab roof 42 for golf carts made by different vendors, the adjustable bracket permits the interchangeability of housings and brackets.

The housing 34 may be custom designed to fit the cab roof 42 for a particular model of golf cart. The housing 34 may be sized and shaped so as to enclose the fans 66*a–b* and heat exchanger 60, as shown in FIG. 3. Enclosing the heat exchanger 60 in the housing 34 locates the heat exchanger 60 in close proximity to the spray nozzle assembly 54. This reduces the amount of time available for the water to heat up after the water exits the heat exchanger but before the water is sprayed out through the nozzle.

Acceptable heat exchangers 60 include, but are not limited to, thermo-electric heat exchangers commonly referred to as Peltier devices. An example of a commercially available thermo-electric heat exchanger acceptable for use in one embodiment according to the present invention is model AL-070-12-00 sold by Melcor Corporation.

Also, since some of the water is recirculated through the pressure relief valve back into the reservoir, this eliminates energy consumption for cooling water which would then be reinjected in the reservoir 10 rather than being sprayed through the nozzle onto the occupants.

Figure 5:
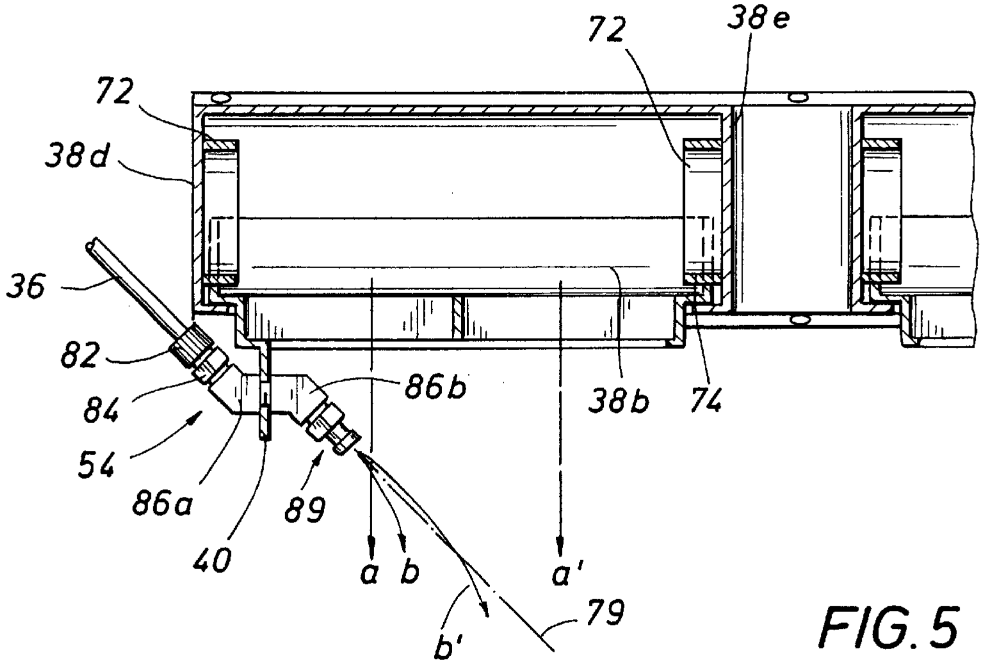
FIG. 5 is a perspective view of the slat body and internal elements viewed along lines 5—5 in FIG. 4.

Vent 38*b* is illustrated in FIGS. 4 and 5, as mounted for pivotal movement in housing 38*a*. Circular supports or rotator rings 72 are attached to side members 38*d* and *e*. Vent 38*b* includes semi-circular portions which mount over the support rings 72 such that the vent 38*b* is rotatable.

Also as seen in FIG. 5 the mist flow denoted by arrows b and b' is injected into the air flow stream denoted by a and a' at an acute angle generally designated by dashed line 79. Injection of the water spray mist as an acute angle increases the portion of the mist cloud that is entrained and carried by the fan air flow toward the golf cart occupants.

FIG. 6 shows a section view of the spray nozzle 54*a*. Liquid conveying tube 36 is connected to a tubing fitting 82 which is inserted into a bushing 84. The bushing 84 is connected to nozzle body 86, which include a first portion 86*a*, middle portion 86*b*, and exit portion 86*c*. Nozzle body 91 is inserted into exit body portion 86*c*. The nozzle tip body 91 has a filter 90 for removing debris from the water which may clog the nozzle tip orifice 102, which is screwed into nozzle body portion 86*c*. The nozzle tip body 91 also contains a check ball 92 and a spring 94 which are held in place by the nozzle tip 98 inserted into the nozzle tip body 91.

As shown in FIG. 6, the small nozzle tip orifice 102 atomizes the pressurized water into a fine mist. The check valve 96 prevents any water from exiting the nozzle assembly 54 until a minimum acceptable pressure has been reached. Also the check valve 96 reduces leakage and dripping after the pump has been cut off. The check valve 96 functions in conjunction with the pressure relief device shown in FIG. 7.

Pressurized water is simultaneously directed through tubing 17 and 104 both towards the spray nozzle assembly 54 and the pressure relief device 103, which is mounted into the water supply reservoir 10 (FIG. 7). The pressure relief device 103 permits pressurized water to enter from the tubing 104 through the tubing fitting 106 into a ninety degree elbow 108 which is connected to the reservoir 10 via a bushing 110. A nozzle tip body 114 having a filter 112 inserted therein is inserted into bushing 110. The orifice tip 118 has the same diameter as the orifice tip 102 in the spray assembly 54*a*. The combination spray nozzle assembly 54 with check valve 96 and the pressure relief device 103 permits a continual flow of pressurized water both to each of the spray nozzles 54*a–b* and the pressure relief device 103. When the pump is deactivated the water pressure in the pressure relief device 103 is slightly lower than the water pressure into the spray nozzle assembly 54 because of the head pressure caused by the spray nozzle assembly 54 being raised above the level of the pressure relief device 103. The pressurized water then exits through the pressure relief device 103 back into the reservoir tank 10, conserving the water, and allows the check valve 96 to immediately close which prevents each of the spray nozzles 54*a–b* from leaking and dripping.

In one embodiment according to the present invention, the orifice tip 102 has a diameter of about 0.012 inch and the water pressure ranges from about 70 psi to about 200 psi. The diameter of the orifice tip 102 and the water pressure may be varied to accommodate a variety of combinations of orifice tips 102 and water pumps provided that the combination provides a mist of atomized water that is sprayed substantially throughout the air flow from the fan.

FIG. 8 shows a schematic representation of the overall water deliver and conservation system. Pump 16 conveys water from the reservoir 10 through water conveying line 17 to a heat exchanger 60 where the water is cooled. The cooled water is conveyed via water line 17*a* to the spray nozzle assemble. The atomized water is sprayed out of the nozzle initially in the direction shown by arrow b. Fan 66 blows air in the direction shown by arrow a. Water is conserved by recycling pressurized water through water line 104 to the pressure relief device 103. Discharge of the pressurized water into reservoir 10 serves the dual function of conserving water for reuse and relieving pressure in the spray nozzle assembly which reduces dripping.

FIG. 9 is a schematic overview of the electrical system for use with electricity supplied by batteries. Key switch 59 is a lock out switch which prevents the use of the misting apparatus unless the occupant has a key. The pressure activated seat switch 18 turns off the fan, heat exchanger and pump when the golf cart is not occupied. Pump switch 58 permits the pump to be turned off while still allowing the fan 66 to be used if the occupant wants cooling from blown air without any water mist. The heat exchanger switch 57 permits the heat exchanger to be turned off although the pump 16 and fans 66 are still engaged. This permits the occupant to spray uncooled water if desired. The fan 66 has a rotary switch 56 to control the fan speed to control air flow rate and noise levels near the golf cart.

The foregoing disclosure and description of the invention are illustrative and explanatory thereof, and various changes in the details of the illustrated apparatus and construction and method of operation may be made without departing from the spirit of the invention.

The foregoing disclosure and description of the preferred embodiment are illustrative and explanatory thereof, and various changes in the components, circuit elements, circuit configurations, and signal connections, as well as in the details of the illustrated circuitry and construction and method of operation may be made without departing from the spirit and scope of the invention.

What is claimed is:

1. A misting apparatus for use on a golf cart or other open-air vehicle, comprising:

a bracket adapted to be mounted onto the open-air vehicle;

a fan mounted with the bracket for blowing air towards an occupant of the open-air vehicle;

a water spray nozzle mounted with the bracket adjacent to the fan and positioned to direct spray from the nozzle directly at an acute angle to the air blowing from the fan to blow an air/mist combination towards the occupant;

a water reservoir adapted to be mounted with the open-air vehicle;

a pump for pumping and pressuring water from said water reservoir;

a first water line in fluid communication with said water spray nozzle and said water reservoir; and a heat exchanger means mounted in said first water line in fluid communication with said water reservoir and nozzle to reduce the temperature of said water from said reservoir before such water exits said nozzle.

2. The misting apparatus of claim 1 further comprising:

a housing mounted with the bracket, wherein the water spray nozzle is mounted with the housing which directs the air/mist combination towards the occupant.

3. The misting apparatus of claim 2, further comprising:

the bracket having a longitudinally extendable bracket bar adapted to adjustably fit the width a cab of the golf cart or other open-air vehicle.

4. The misting apparatus of claim 1, further comprising:

a pressure relief device mounted with said reservoir and in fluid communication with said first water line for receiving pressurized water from said first water line.

5. The misting apparatus of claim 1, further comprising:

a pressure activated switch adapted to be mounted under the vehicle seat.

6. The misting apparatus of claim 1 wherein the heat exchanger means is a thermoelectric heat exchanger.

7. The misting apparatus of claim 2, further comprising:

a vent assembly mounted with said housing for directing air from said fan and the spray from the nozzle toward the occupant.

8. The misting apparatus of claim 7, wherein:

said vent assembly further comprises a nozzle support to hold the nozzle so as to direct the mist into the air blowing from the fan.

9. The misting apparatus of claim 8, wherein:

said vent assembly further comprises a nozzle support to hold the nozzle so as to spray the mist at an acute angle relative to the vent assembly.

10. A misting apparatus for use on a golf cart or other open-air vehicle, comprising:

a water reservoir;

a bracket adapted to be mounted onto the open-air vehicle;

a pump in fluid communication with the reservoir;

a housing being mounted with the bracket and having a first and second vent assembly;

a first and second fan received by the housing and communicating with the first and second vent assemblies;

a first and second nozzle mounted with the housing and adjacent to the first and second vent assemblies, the nozzles positioned to direct spray from the nozzle directly to the air blowing from the fan to blow an air/mist combination towards the occupant;

a water reservoir adapted to be mounted with the open-air vehicle;

a pump for pumping and pressuring water from said water reservoir;

a first water line in fluid communication with said water spray nozzle and said water reservoir; and a heat exchanger means mounted in said first water line in fluid communication with said water reservoir and nozzle to reduce the temperature of said water from said reservoir before such water exits said nozzle.

11. The misting apparatus of claim 10 wherein said heat exchanger means is thermoelectric.

12. The misting apparatus of claim 10 wherein the nozzle is supported by a nozzle support ring so as to spray the mist at an acute angle relative to the vent assembly.

13. A misting apparatus for use on a golf cart or other open-air vehicle, comprising:

a water reservoir;

a bracket adapted to be mounted onto the open-air vehicle;

a pump in fluid communication with the reservoir;

a housing being mounted with the bracket and having a first and second vent assembly;

a first and second fan received by the housing and communicating with the first and second vent assemblies;

a first and second nozzle mounted with the housing and adjacent to the first and second vent assemblies, the nozzles positioned to direct spray from the nozzle directly to the air blowing from the fan to blow an air/mist combination towards the occupant;

a first water line in fluid communication with the nozzle and the water reservoir; and a pressure relief device mounted with said reservoir and in fluid communication with the first water line for receiving pressurized water from the first water line.

14. A misting apparatus for use on a golf cart or other open-air vehicle comprising:

a bracket adapted to be mounted onto said open-air vehicle;

a fan mounted within said bracket for blowing air toward an occupant of said open-air vehicle;

a water spray nozzle mounted within the bracket adjacent to the fan and positioned to direct spray from the nozzle directly to the air blowing from the fan to blow an air/mist combination toward the occupant; and said bracket including means for extending said bracket to allow for attachment of said misting apparatus to various desired structures.

* * * * *